Feb. 26, 1935.  J. C. CREAGMILE  1,992,521
WHEEL ALIGNER
Filed March 7, 1933   2 Sheets-Sheet 1
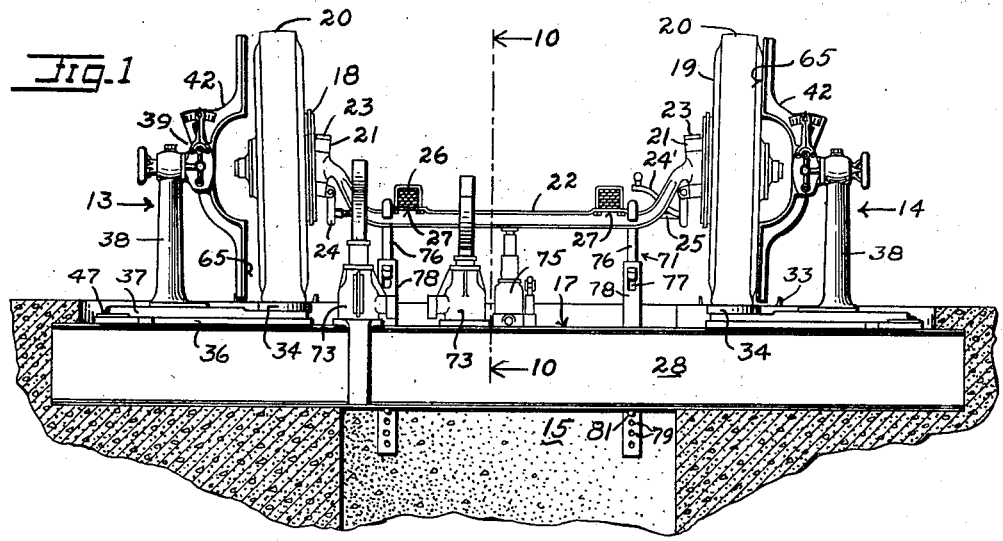
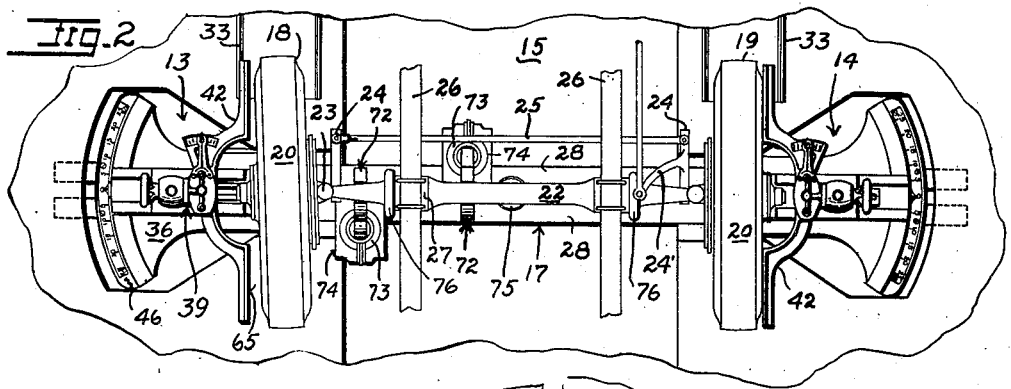
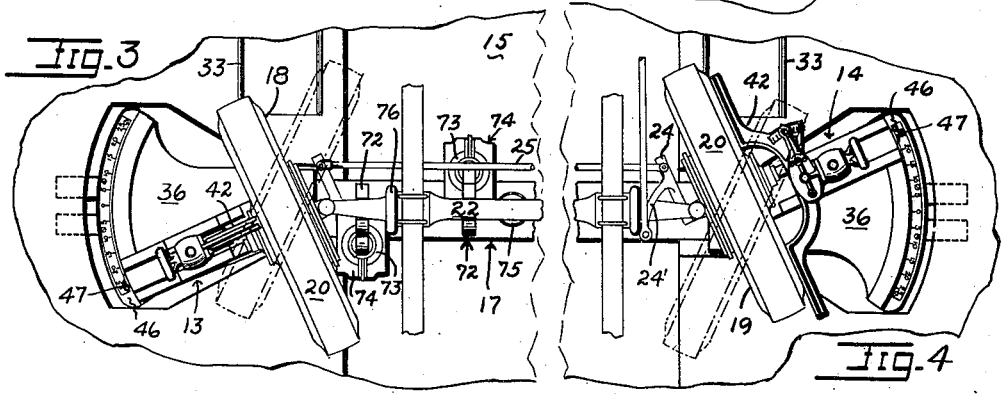
INVENTOR.
JOHN C. CREAGMILE
BY Henry N. Young
ATTORNEY.

Feb. 26, 1935.  J. C. CREAGMILE  1,992,521
WHEEL ALIGNER
Filed March 7, 1933  2 Sheets-Sheet 2
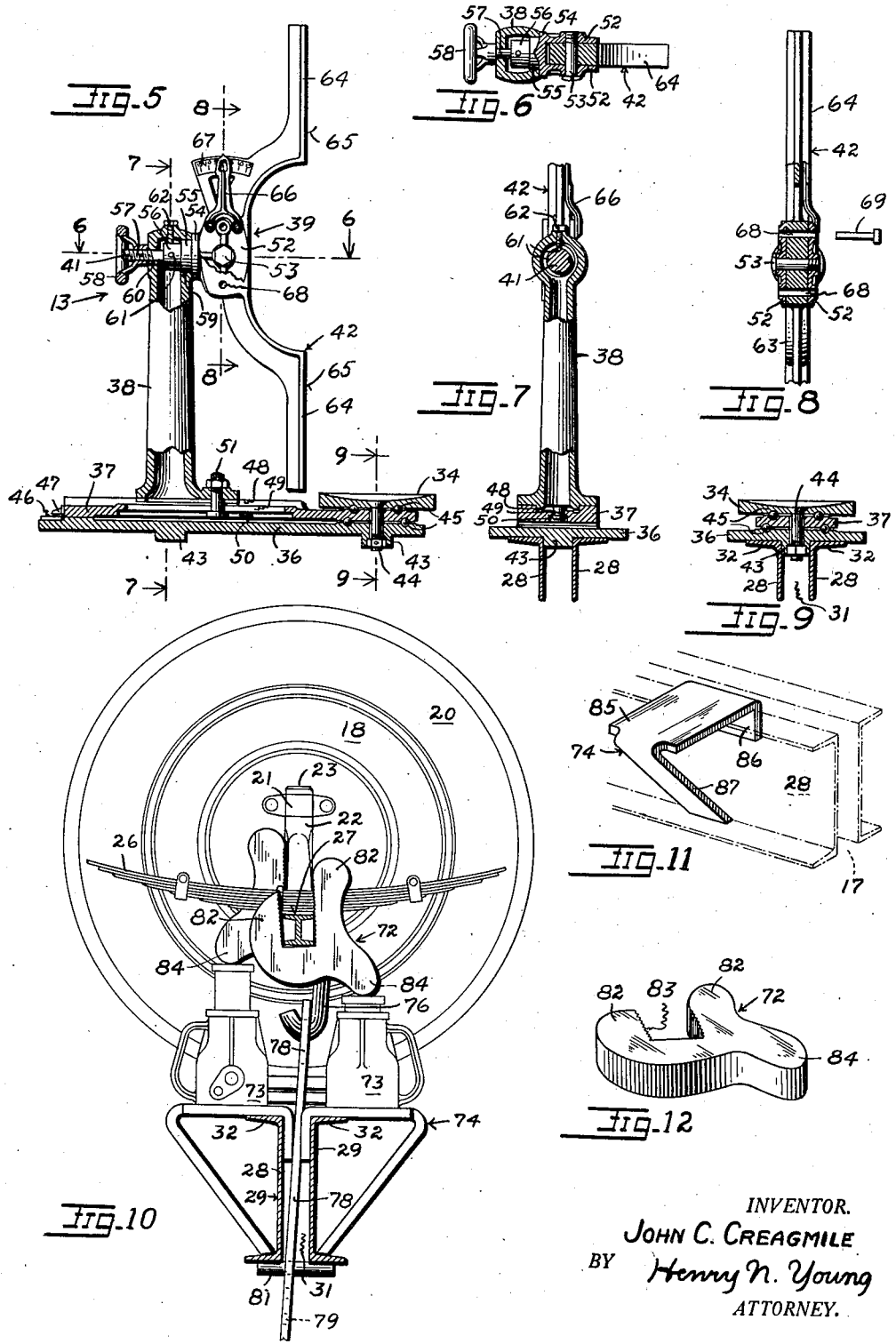
INVENTOR.
JOHN C. CREAGMILE
BY Henry N. Young
ATTORNEY.

Patented Feb. 26, 1935

1,992,521

UNITED STATES PATENT OFFICE 1,992,521

WHEEL ALIGNER

John C. Creagmile, Berkeley, Calif.

Application March 7, 1933, Serial No. 659,949

9 Claims. (Cl. 33—203)

The invention relates to apparatus for gauging various alignment relations of dirigible wheels of vehicles and to means for effecting any necessary correction of certain of said relations.

An object of the invention is to provide a generally improved apparatus for gauging the camber, caster, toe-in and turning radius of the dirigible wheels of automobiles and other steerable vehicles.

Another obect is to provide for the gauging of dirigible wheels of a vehicle while the same are operative to support the vehicle in their intended manner.

A further object of the invention is to provide a simple and effective means for correcting erroneous camber and caster conditions which have been determined by the gauging apparatus.

The invention possesses other objects and features of advantage, some of which, with the foregoing will be set forth or be apparent in the following description of a typical embodiment of the invention which is illustrated in the accompanying drawings in which, Figure 1 is a front elevation of an assembly of apparatus embodying the invention, test bars of the apparatus being shown in upright disposal as for testing camber.

Figure 2 is a plan view of the showing of Figure 1, the test bars of the apparatus being horizontally disposed as for testing toe-in and turning radius.

Figure 3 is a fragmentary plan view illustrating the method of gauging caster with the present apparatus.

Figure 4 is a fragmentary plan view illustrating the method of gauging the degree of turning of a wheel.

Figure 5 is an enlarged and partly sectional elevation of a testing unit of the testing apparatus.

Figure 6 is a plan section at 6—6 in Figure 5.

Figure 7 is a fragmentary and partly sectional view taken generally at 7—7 in Figure 5.

Figure 8 is a fragmentary sectional view at 8—8 in Figure 5.

Figure 9 is a section at 9—9 in Figure 5.

Figure 10 is an enlarged view at 10—10 in Figure 1.

Figures 11 and 12 are perspective views of bracket and twisting members respectively of the means for correcting camber and caster.

In its present embodiment, the wheel gauging means of my invention comprises similar and mutually complementary gauging units 13 and 14 mounted for relative adjustment in a straight line and arranged for the disposal of the dirigible wheel assembly of an automobile, or like vehicle, between them. As a means to facilitating the making of necessary adjustments of the vehicle parts for effecting any required correction of wheel alignment relations, the units 13 and 14 are disposed at opposite sides of a mechanic's pit 15 extending below the level of a floor surface 16, said surface preferably being horizontal. A beam or girder 17 spans the pit 15, said beam being arranged to support the units 13 and 14 and the dirigible wheel assembly to be gauged, the latter comprising right and left-hand wheels 18 and 19 having pneumatic tires 20 and mounted on the spindles of steering knuckles 21 pivoted to the ends of a usual axle 22 by means of generally upright king pins 23. The usual spindle arms 24 extend from the steering knuckles 19 and are connected by a tie rod 25 of adjustable length. The axle 22 supports the vehicle body (not shown) through springs 26, said springs engaging spaced spring perches 27 on the axle and being only fragmentarily shown.

As particularly brought out in Figures 9 and 10, the beam 17 comprises a pair of like channel members 28 disposed edgewise and having their web portions 29 in slightly spaced back-to-back relation whereby to define a slot 31 of uniform cross-section between them. The channels 28 are relatively fixed, and the units 13 and 14 are slidably mounted thereon for relative adustment longitudinally of the girder. The top surface of the beam 17 defined by the upper flanges 32 of the members 26 is preferably plane and horizontal, whereby said surface may provide a reference surface for use in a manner to be hereinafter described.

For making the various tests with the present apparatus it is desired that the vehicle axle 22 be disposed parallel to and vertically above the girder 17, and that the wheels 18 and 19 be free for steering movement thereof about the king pins 23, the axes of said pins defining the steering axes for the wheels. To assist in disposing said axle as desired, parallel and appropriately spaced guideway channels 33 are extended from the girder 17 and at right angles thereto along the floor surface 16 for so guiding the vehicle as it is moved into position for a testing of the dirigible wheel assembly that the longitudinal axis of the vehicle is perpendicular to the girder and the axle 22 may be disposed in a vertical plane through the longitudinal girder axis.

When the axle is disposed in the latter position, the treads of the tires 20 are arranged to rest on turntable discs 34, said discs comprising inner elements of the gauging units 13 and 14. The top surfaces of the discs 34 are concavely cupped whereby to maintain a centered engagement of the bearing points of the tire treads therewith, it being noted that the relative adjustment provided for the units 13 and 14 permits a spacing of the turntable axes in accordance with the spacing of the bearing points of the tires. Assuming the tire diameters alike at their tread circles, as is necessary for a proper cooperation of coacting dirigible wheels, it will be noted that measurements taken vertically from the top, and reference, face of the girder 17 to corresponding axle points at opposite sides of the axle center will permit a checking as to the shape of the axle in a vertical plane and its actual disposition with respect to a supporting surface for the vehicle, the turntable top surfaces preferably lying in the plane of the floor surface 16. Should the aforesaid checking disclose that the common plane of the spring perches 27 is not parallel to the gauging face of the girder, a bent axle is usually indicated, and correction should preferably be made before the hereinafter described alignment tests and adjustments are made.

Referring now to the units 13 and 14 for use at the outer sides of the wheels 18 and 19 respectively, it is noted that said units are of similar structure but have their corresponding elements oppositely related in the respective assemblies whereby said elements are in corresponding relation to the adjacent wheels. By particular reference to Figures 5 to 9 inclusive, it is noted that each said unit comprises a bed-plate 36, an elongated base-plate 37 carried by said bed-plate for adjustment about a fixed vertical axis at its inner end, the discs mounted on the base 37, an upright standard 38 carried on the base 37, and a testing head assembly 39 mounted at the top of the standard. The assembly 39 essentially comprises a shaft 41 swivelled in the upper end of the standard for adjustment about a horizontal axis and a test bar 42 intermediately pivoted to the inner shaft end for angular adjustment about an axis perpendicular to that of the shaft.

The bed-plate 36 comprises an elongated and somewhat sector-shaped member having depending tongues 43 for sliding engagement in the girder slot 31 when the bed-plate rests on the girder whereby the bed-plate may be held in fixed angular relation to the girder while longitudinally slidable therealong to different adjusted positions thereof. The pivotal axis of the base 37 is defined at a vertical pivot pin 44 (Figures 5 and 9) engaging in and between the turntable and bed-plate at corresponding and inner ends of these elements. The wheel-carrying disc 34 is coaxial with the pivot pin 44; as shown, said pin also engages through the disc 34 for centering the same in its place. Sets of ball-bearings 45 are provided between the turntable disc 34 and base plate 37 and bed-plate 36 to minimize friction between these members adjacent the pin 44, it being clear that the turntable disc 34 is arranged for free turning with and beneath a wheel which it supports.

An arcuate angle scale 46 is provided at the outer end of the bed-plate 36, the center of curvature of said scale comprising the turntable axis defined by the pin 44. A pointer 47 is provided at the outer end of the base 37 for movement over the scale 46 as the base is adjusted about the pivot pin 44, the zero of the scale being mediately thereof whereby the line of said zero point and the pivot pin 44 lies in a vertical plane through the longitudinal girder axis. Normally, the pointer 47 registers with the zero of the scale 46.

Outwardly of the turntable disc 34, the base member 37 is provided with a longitudinal slot of uniform cross-section and having stepped sides whereby upper, intermediate and lower slot portions 48, 49 and 50 are provided, the slot portion 49 being narrowest. The bottom of the standard 38 is arranged to slidably bear on the top of the base member 37 and is formed with a depending portion engaging in the upper stop portion 48 whereby the standard is guided for a rectilinear movement longitudinally along the member 37, while maintaining a fixed angular relation to the member. An inwardly extending standard base portion carries a locking bolt 51, said bolt extending through the slot portions 48 and 49 and having its head disposed in the slot portion 50 and against the lower side of the member thereat whereby the standard may be releasably fixed in adjusted position on the base member by tightening a nut mounted on the upwardly protruding bolt portion.

It will now be noted that the standard 38 is generally hollow and provides a bearing bore therethrough at its upper end to receive the head shaft 41 for rotation thereof about a horizontal axis lying in the same vertical plane as a line joining the base pointer 47 with the axis of the pivot pin 44 whereby the shaft axis perpendicularly intersects the axis of the pin 44. As particularly shown, the shaft 41 is forked at its inner end to provide ears 52 for receiving the test bar 42 between them, a pin 53 engaging through the ears and bar for pivotally mounting the bar on the shaft and having its axis intersecting and perpendicular to the shaft axis. Outwardly of the ears 52 the shaft is formed with cylindric portions 54, 55, 56 and 57 of progressively decreasing cross-section, the shaft portion 57 being threaded to mount a hand-wheel nut 58 at its outer end. The shaft portions 55 and 57 engage bearing bore portions 59 and 60 in the standard whereby the shaft is swivelled to the standard for a solely rotative movement in its place and may be releasably locked in a rotatively adjusted position thereof by tightening up the nut 58.

In using the present apparatus, the test bar 42 is arranged to be set for gauging applications when either horizontal or vertical, and means are provided to assure either such setting of the bar. As shown, sockets 61 are provided in a circle about the shaft portion 56, said sockets being arranged to selectively receive the point of a set screw 62 engaged in the top of the standard and extending radially of and toward the shaft. In this manner, the shaft may be set in a rotatively adjusted position thereof, the sockets 61 being mutually spaced 90 degrees apart in the present instance for providing the beforementioned positioning of the test bar.

The test bar 42, it will now be noted, comprises an arcuate central portion 63 from the ends of which mutually aligned straight-edge portions 64 extend, the latter portions providing portions of a planar test face 65 for diametric application against the outer face of a tire 20. The arrangement is such that the bar portion 63 spans the usual extending hub of the vehicle wheel to be gauged. A shaft ear 52 carries a pointer 66 for movement over a scale 67 provided on the bar portion 63, said pointer registering with a central zero point of said scale when the plane of the test face 65 is perpendicular to the shaft axis: in this manner, the angularity of various settings of the test bar with respect to a vertical plane perpendicular to the shaft axis may be directly determined. As particularly shown in Figure 8, registering sets of bores 68 are provided through the bar 42 and ears 52 for receiving a pin 69 for retaining the bar in set angular relation to the shaft axis. In the present instances, two sets of pin-receiving bores 68 are provided, one set being used when the pointer 66 registers with the zero of the scale 67, while the other bore set is used when the pointer reads one and one half degrees on the scales, the latter angle being the setting for camber as is hereinafter more fully set forth.

For testing toe-in with the now described apparatus, the test bars 42 are disposed horizontally, as in Figure 2, and the variation from parallelism of the wheels is measured through use of one or both of the scales 67. Any needed correction of toe-in is effected by appropriately varying the effective length of the tie-rod 25.

In Figure 4, the positions of one wheel as for checking the turning radius relations of the wheel pair are indicated. The necessary angle measurements are made solely by use of the scales 46 of the testing units, the test bar 42 being horizontal and in perpendicular relation to the axes of the shafts which carry them and readings being taken simultaneously for both wheels. This test involves a difference of readings, and is made by setting one wheel at a predetermined turn angle, and then measuring the turning angle of the other wheel. The difference of the two angle readings is compared with a tabulation (not shown) of preferred values of such differences, said tabulation being based on the length of wheelbase of the vehicle and the predetermined angle of setting of the first wheel. Correction for turning radius is made by appropriately bending the steering arm 24' of the measured wheel in a horizontal plane.

For testing camber with the present apparatus, and with the dirigible wheels 18 and 19 to be tested resting on the discs 34, said wheels would be set in the straight-ahead steering position thereof by disposing them in equal angularity to the test bars 42, said bars being horizontal and similarly set for the purpose. With the base pointer 47 registering with the zero of the scale 46, the test bar 42 would now be disposed in upright position and with its test face 65 at an angle of one and one-half degrees from the vertical, this setting being most accurately made by the disposal of the pin 69 in the appropriate bore 68; in this manner, the test face 65 will be parallel to the opposed tire face if the latter has the required degree of camber. If now the standard 38 is shifted horizontally toward the wheel to dispose the test bar diametrically against the opposed tire face, the correctness of the camber setting for the wheel may be positively determined. Correction of faulty camber may be effected by appropriately bending the axle 22 in a vertical plane therethrough.

It will now be particularly noted that in properly aligned dirigible wheel assemblies, the axis of each king pin is the steering axis of a wheel and should intersect the central tire plane at a point therein slightly forwardly of the bearing point of the tire, this relation providing a desirable caster condition whereby steering is facilitated and the wheels tend to maintain straight-ahead steering positions thereof. One effect of caster is to produce different camber values for a wheel for different turning positions thereof, and this fact is utilized for determining the caster setting of a wheel with the present apparatus, the method essentially comprising the direct measurement of the camber value by use of the scale 67 for predetermined right and left-hand positions of the wheel being tested.

For gauging the caster of the wheel 18 with the present apparatus, said wheel is first set at a left-turn position (Figure 3) by use of the scale 46 in the manner described for effecting a turning radius setting, and the camber angle of the wheel for such position is then measured by use of the testing head scale 67, the test bar being generally upright for adjustment in a vertical plane including the shaft axis and the axis of the pivot pin 44. The wheel 18 is then set at a predetermined right-turn position and the camber angle for its new position is similarly found. The difference between the two camber angle readings is taken as a measure of caster, the correctness of which may be checked by reference to an appropriate tabulation (not shown) based on predetermined steering angles and the manufacturer's specification for the particular model of automobile being tested. By reason of the disclosed disposal of the vertical axis of adjustment of the testing head in general alignment with the steering axis, and the fact that only a difference of angle readings is significant, the test bars 42 may be applied opposite the same tire points for both readings and no rolling rotation of the wheels would be permitted during the test.

Correction for faulty caster may be made by inserting wedge shims (not shown) at the spring perches. If, however, the caster of the two wheels is different, it may be necessary to correct for equality of caster through twisting the axle 22 at an appropriate point thereof. As in testing camber, the caster determinations and corrections are independent for the two wheels and are made with corresponding operations at the different wheels.

Means are provided in association with the beam 17 for bending or twisting the axle 22 for correcting a faulty camber or caster condition which may have been detected through use of the gauging units 13 and 14 which are carried at the beam ends. As particularly shown, said means comprises a pair of tension members 71 for operative engagement between the axle and beam, a pair of twisting members 72, jacks 73 for coaction with said members, brackets 74 mounted on the beam 17 to support the jacks 73 in offset relation to the beam axis, and a jack 75. The tension members 71 comprise C-shaped links 76, the upper hooks of which engage over the axle 22 while the lower hooks engage eyes 77 in flat bars 78 which depend therefrom and through the beam slot 31 to a point below the beam, the lower bar end being provided with holes 79 for receiving pins 81 for disposal transversely of the beam axis to engage against the lower face of the beam when the link is lifted.

While the wheels 18 and 19 are disposed for gauging in the described position, the pins 81 are engaged in the highest possible holes 79 of the bars 78 whereby a slight lifting of the axle by means of the jack 75 resting on the beam 12 will engage the pins against the under side of the beam to tense the members 71 and thereby positively fix the axle in place. After the members 71 are tensed in place, a further actuation of the jack 75 to urge a lifting of the axle may bend the axle, as for correcting camber, it being obvious that the tension members and jack (or jacks) may be variously located along the axle for bending the same as required at a specific point thereof. In connection with the indicated method of bending the axle in a vertical plane, attention is called to the disclosure of U. S. Patent No. 1,890,935, said patent issued to applicant and F. H. Reiman on Dec. 13, 1932.

As is particularly brought out in Figures 10 and 12, the twisting blocks 72 provide opposed jaws 82 defining a rectangular space 83 between them for non-rotatably receiving the generally rectangular axle 22 therein from above, said axle being of a usual I-beam section. The members 72 also include arm portions 84, said arms arranged to extend laterally of the axle while the axle engages in the space 83. In use, the twisting members 72 are so mounted on the axle that the arms 84 of the different members extend oppositely from a vertical plane through the axle axis. The brackets 74, it will be noted, comprise a flat base portion 85 for horizontal disposal and having a depending flange 86 at one edge thereof for extension into the beam slot 31 and a strut portion 87 depending obliquely from the opposite edge for the engagement of its lower and free end in the angle defined by a channel web 29 and the lower channel flange, the essential relations of the bracket parts being such that the bracket portion 85 is horizontal when the bracket is mounted in place.

It will now be noted that the brackets 74 are mounted beneath the arms 84 of the members 72 and that the jacks 73 are arranged for operation between the brackets and arms to urge a twisting of the axle. With the members set as shown, the different jacks are operative to twist the axle in mutually opposite directions whereby the jacks may be selectively operated to permanently twist the axle for correcting or equalizing the caster of the king pins 23. It will be understood that the members 72 may be advantageously utilized to prevent a twisting of the axle during a vertical bending thereof, and that the tension members and jack 75 may be used to steady the axle against displacement and vertical bending during the described twisting thereof. And it will be noted further that the twisting members 72 may be variably placed along the axle whereby to localize the twisting of the axle where required. A further advantage of the present arrangement of apparatus is that a cold bending or twisting of the axle may be effected to correct camber or caster conditions while the gauging means is in operative relation to the vehicle wheels whereby to minimize the time and effort required on the part of a mechanic.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In a wheel gauging means of the class described, a testing head for operative disposal adjacent a side of a vehicle wheel to be tested, a horizontal turntable disc for supportingly engaging said wheel at the bearing point thereof, and a turntable carrying said head for angular adjustment about a vertical axis coaxial with the disc axis, said head being eccentric with respect to said axis.

2. In a wheel gauging means of the class described, a testing head for operative disposal adjacent a side of a vehicle wheel to be tested, a freely rotatable disc for axially and supportingly engaging said wheel at the bearing point thereof, and a turntable carrying said head for angular adjustment about a vertical axis extending through said bearing point of the wheel, said turntable supporting said disc.

3. In a wheel gauging means of the class described, a testing head for operative disposal adjacent a side of a vehicle wheel to be tested, a turntable disc for supportingly engaging said wheel at the vehicle-supporting bearing point thereof, a turntable carrying said head for angular adjustment about a vertical axis coaxial with the axis of the disc, and means supporting said disc on said turntable for free rotation with and beneath the wheel supported thereby.

4. In a wheel gauging means of the class described, a testing heat for operative disposal adjacent a side of a vehicle wheel to be tested, a turntable for rotation about a vertical axis through the bearing point of the wheel, a standard carrying said testing head, and means mounting said standard on said turntable for rectilinear adjustment radially of said turntable axis.

5. In a wheel gauging means of the class described, a testing head for operative disposal adjacent a side of a vehicle wheel to be tested, a turntable for rotation about a vertical axis through the bearing point of the wheel, a standard carrying said testing head, and means mounting said standard on said turntable for adjusted disposal in a straight line extending radially of said turntable axis, said standard being arranged to have the same angular relation to said turntable for all adjusted positions thereof.

6. In wheel gauging apparatus of the class described, a testing head providing a test bar for operative disposal adjacent a side of a vehicle wheel to be tested, a turntable for adjusted rotation about a vertical axis extending through the bearing point of the wheel, a standard, means mounting said standard on said turntable for adjusted disposal in a straight line extending radially of said turntable axis, and a shaft journalled in said standard and carrying said head, the axis of said shaft being perpendicular to and intersecting the turntable axis.

7. In apparatus for gauging the alignment relations of a cooperating pair of dirigible wheels supporting the extremities of a horizontal axle, a fixed support beam disposed longitudinally beneath said axle, turntable discs supported by said beam for adjustment therealong for axially engaging the different said wheels at the bearing points thereof for supporting the wheels, testing heads for operative disposal at the outer sides of said wheels, standards carrying said heads, and base members mounted on said beam for independent adjustment therealong and in a common line and each mounting a said standard and a corresponding disc for relative adjustment in a plurality of straight lines extending radially from the respective axes of said discs.

8. In a unit for testing automobile wheels, a standard arranged vertically, a horizontal shaft swivelled in the standard for solely rotatable adjustment with respect thereto, a test bar carried at one end of said shaft and extending transversely of the shaft axis for engagement with an automobile wheel diametrically thereof, and means mounting said standard for solely longitudinal and rectilinear movements thereof toward and from a said wheel to be tested with the unit and in a plurality of radial directions from a fixed upright axis which extends through the bearing point of the wheel.

9. In a unit for testing automobile wheels, a standard arranged vertically, a horizontal shaft swivelled in the standard for solely rotatable adjustment with respect thereto, a test bar carried at one end of said shaft in pivoted relation thereto and providing a straight edge for engagement with an automobile wheel diametrically thereof, means on the shaft and bar cooperative to measure the angular relation of said straight edge to a vertical plane perpendicular to the shaft axis, and means mounting said standard for solely rectilinear movements thereof toward and from a said wheel to be tested with the unit and in a plurality of mutually convergent lines.

JOHN C. CREAGMILE.